(12) United States Patent
Morgan et al.

(10) Patent No.: US 12,469,020 B2
(45) Date of Patent: Nov. 11, 2025

(54) INTERRUPTION FREE VISION CHECKOUT

(71) Applicant: NCR Voyix Corporation, Atlanta, GA (US)

(72) Inventors: Kip Oliver Morgan, Atlanta, GA (US); Gina Torcivia Bennett, Lawrenceville, GA (US); Julia Anne Ogilvy, Cumming, GA (US); Jerry Steven Massey, Lawrenceville, GA (US); John Kennedy, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 61 days.

(21) Appl. No.: 18/412,309

(22) Filed: Jan. 12, 2024

(65) Prior Publication Data

US 2025/0232279 A1    Jul. 17, 2025

(51) Int. Cl.
  *G06Q 40/00*  (2023.01)
  *G06Q 20/18*  (2012.01)
  *G06Q 20/20*  (2012.01)

(52) U.S. Cl.
  CPC .......... *G06Q 20/208* (2013.01); *G06Q 20/18* (2013.01); *G06Q 20/201* (2013.01)

(58) Field of Classification Search
  None
  See application file for complete search history.

(56) References Cited

U.S. PATENT DOCUMENTS 12,217,457 B1 * 2/2025 Miranda Artacho ........................ G06V 10/768
2018/0096331 A1 * 4/2018 Patil ..................... G08B 13/246
2018/0276456 A1   9/2018 Miyagi
2019/0026718 A1   1/2019 Iizaka
2019/0311167 A1  10/2019 Powell et al.
2020/0320505 A1  10/2020 Crooks et al.
2021/0334480 A1  10/2021 Gururaja et al.
2023/0087587 A1 * 3/2023 Yang .................. G06V 30/2247
                                                        705/23
2023/0097352 A1 * 3/2023 Ushijima .................. G06T 7/70
                                                        705/23
2023/0252343 A1 * 8/2023 McDaniel ............ G06K 7/1413
                                                        706/12
2025/0000282 A1 * 1/2025 Morgan .................... G07G 1/14

OTHER PUBLICATIONS

"European Application Serial No. 24223748.5, Extended European Search Report mailed Jun. 16, 2025", 7 pgs.

* cited by examiner

*Primary Examiner* — Olabode Akintola
(74) *Attorney, Agent, or Firm* — Schwegman Lundberg & Woessner, P.A.

(57) ABSTRACT

A transaction terminal includes at least one top-down camera, side cameras, and at least one barcode scanner. Images captured by the cameras are processed by one or more computer vision applications for purposes of counting items placed on a tray of the terminal during a checkout. Each item is associated with a bounding box or region of the tray within the images. The computer vision applications and scanner are polled to provide a region identifier, a barcode, and a confidence value for each item on the tray. Duplicated item barcodes are removed and barcodes with the highest confidence values are retained. The final item barcodes are provided to a transaction manager of the terminal to complete the self-checkout with a customer at the terminal.

20 Claims, 6 Drawing Sheets

INTERRUPTION FREE VISION CHECKOUT

BACKGROUND

Vision-based self-checkout is becoming more popular. Consumers are becoming more accustomed to the process of placing items on a tray and letting technology do the work to perform the checkouts. Unrecognized items, however, can diminish the user experience due to awkward user interface flows for resolving the unrecognized items.

DETAILED DESCRIPTION

As stated above, vison checkouts are popular but there are many problems with current approaches employed in the industry. For the most part, vision checkouts rely on machine learning, which requires a lot of training with images depicting items residing on a tray of a self-service terminal (SST). Training takes valuable time and resources and is an ongoing expense because new items are constantly being added to stores and packaging of existing items is regularly changed leading to many untrained vision items. Vision recognition is also subject to environmental conditions such as glare and shadows which can distort item images taken during self-checkouts. With vision checkouts, unrecognized items are commonplace which negates the checkout throughput advances achieved by vision item recognition. Unrecognized item flows with vision checkouts are complicated and frustrating to customers. Shrink has also increased in the industry due to barcode/product switching as the SST.

These issues are solved with the teachings provided herein and below. An SST is equipped with a plurality of cameras and sensors, at least one camera is a top down camera that cameras a top down image of the SST's tray. The top down image is segmented into regions and an item count is determined. Each region is represented as a bounding box within the top down image and other images captured by additional cameras of the SST. When items are unrecognized by the top down camera's vision application, the sensors and vision applications are polled in a round robin.

The sequence of the round robin is of no import. If an item is detected from another sensor that is not in the list of what the top down camera already sees, it identifies the item if the confidence from the extra sensor exceeds a threshold. The threshold is configurable and can be set to a same threshold that top down camera uses to confirm the sale of items. A radio frequency identification (RFID) sensor, for example, likely has a confidence factor of 100% for each item detected. Even a barcode scanner looks for items in a laser view and submits those with 100% confidence for each item detected. Other cameras from different angles are not likely to produce a 100% item recognition confidence via a vision application but any confidence over a configurable threshold results in the item being recognized and sold.

In addition to the confidence factor, a sensor sends a region of the tray the item was detected in. For example, if an RFID tray is smaller than the vision tray, the bounding box for the RFID tray is sent with the barcode and confidence factor so the only items detected in a certain region are identified. The top down camera knows the place on the tray where all items are detected during a checkout. If a sensor cannot give the region of an item that it has identified but the item is already something the top down camera has detected, then the item will not be used as it will be considered a duplicate. All sensors, such as Bluetooth®, near field communication (NFC), side cameras, etc. can send the region of the tray where they can see the item they identify. This helps prevent selling duplicate items as it narrows the zone for which the top down camera is looking to identify items that it cannot. If another item detects an item on the tray, the sensor must pass a check with the top down camera to ensure that the image it detects, such as the top of a bottle cap or can.

The teachings are extensible such that as more sensors are invented and added, the item recognition only gets better with less interruptions for the customers. All a new sensor needs to provide is a barcode, bounding box, and confidence factor for each item that it detects.

A vision-centric self-checkout is provided that is faster and a more accurate experience for customers than is an experience associated with individually scanning each item during the checkout. Because all items are visible and well separated or segmented, there is less chance for accidental or malicious shrink. The vision-based item recognition appears to operate as a conventional vision checkout that works better than has conventionally been the case even through it is supplemented by other sensors and an improved/enhanced processing workflow and logic.

As used herein an "operator" refers to a customer or a cashier. This is the individual that is operating the terminal during a checkout for a transaction of the customer. The terminal can include a self-service terminal for self-checkouts or a point-of-sale terminal for cashier-assisted checkouts.

Figure 1A:
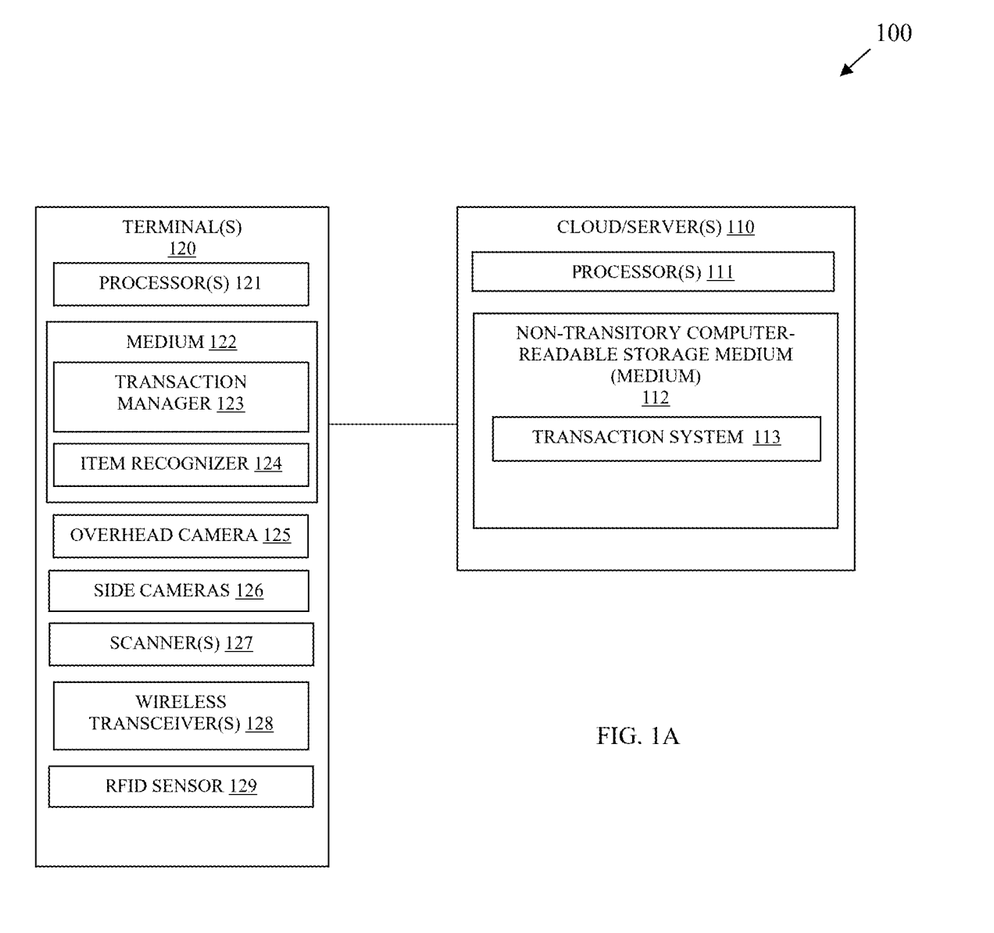
FIG. 1A is a diagram of a system for interruption free vision checkouts, according to an example embodiment.

FIG. 1A is a diagram of a system 100 for interruption free vision checkouts, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of interruption free vision checkouts, presented herein and below.

System 100 includes a cloud/server 110 (hereinafter just "cloud 110") and one or more terminals 120. Cloud 110 includes at least one processor 111 and a non-transitory computer-readable storage medium (hereinafter just "medium") 112, which includes instructions for a transaction system 113. The instructions when provided to and executed by processor 111 cause processor 111 to perform the processing or operations discussed herein and below with respect to 113.

Each terminal 120 includes at least one processor 121 and a medium 122, which includes instructions for a transaction manager 123 and an item recognizer 124. The instructions when provided to and executed by processor 121 cause processor 121 to perform the processing or operations discussed herein and below with respect to 123 and 124. The terminal 120 also includes at least one overhead camera 125, side cameras 126, one or more scanners 127, and, optionally, one or more wireless transceivers 128 and an RFID sensor 129.

In an embodiment, the overhead camera 125, side cameras 126, scanners 127, wireless transceivers 128, and RFID sensor 129 are collectively referred to as "peripherals" or "sensors" herein and below. When a specific use of a peripheral or sensor is recited, its sensor type will be recited herein and below.

In an embodiment, the scanners 127 include a bioptic scanner, a barcode scanner, a flatbed scanner, and/or a handheld scanner. In an embodiment, the scanner 127 is integrated with a weigh scale as a single composite peripheral of terminal 120.

Initially, item recognizer 124 enables or initiates the peripherals and maintains a ranked list of the peripherals from which to select an item code during a checkout at terminal 120. Item recognizer 124 calls one or more computer vision applications with images received depicting the tray and items on the tray during a checkout at terminal 120. The computer vision applications are ranked based on the overhead camera 125 and side cameras 126 to which they relate. Each prioritized peripheral or computer vision application also includes a configured time so that each peripheral stays in synch with one another. The computer vision application applications are configured to return an item region on the tray, an item barcode, and a confidence value for each item recognized from a corresponding image.

For example, a prioritized or ranked list for the peripherals includes 1) RFID sensor 129, 2) overhead camera 125 and corresponding vision application, 3) side cameras 126 and corresponding vision application, 4) flatbed scanner 127, which is disabled until needed when an item recognized requires an item weight, 5) scanner and combined scale 127, and 6) wireless transceivers 128. Item recognizer 124 from each of the peripherals the tray region, an item barcode, and a confidence value.

When a computer vision application identifies a product lookup (PLU) code indicating that an item on the tray is produce or a non-barcoded item requiring a weight. Item recognizer 124 notifies transaction manager 123 to instruct the customer through the transaction user interface to remove all other items from the tray so that the item can be weighed and recorded by the transaction manager 123 for the transaction.

When items are stacked on top of one another such that some of the items are too obscured in the images, item recognizer 124 instructs the transaction manager 123 to notify the customer through the transaction user interface to rearrange the items and not stack item on top of one another.

Computer vision application monitors the tray from the images provide by the overhead camera 125, when a hand is detected and then not detected for a configured period of time, item recognizer 124 begins a next transaction on behalf of transaction manager 123. Computer vision application associated with the overhead camera 125 utilizes an item counting algorithm to count the total number of items on the tray, determine the regions of the tray for the items, and create bounding boxes within the images for the tray regions. The peripherals and computer vision applications report their tray regions, item barcodes for recognized items, and confidence values for the item barcodes. The number of items in each list is checked. Duplicate item barcodes are removed. The highest prioritized and confidence barcodes are retained. The item lists from the sensors and computer vision applications are compared. The number of items in each list is checked. It the item lists match, the item recognizer 124 returns the item barcodes for the items to the transaction manager 123, which displays the item details in the transaction user interface to the customer and completes the transaction with the customer payment.

If barcodes in the peripheral and computer vision application lists do not match, item recognizer 124 uses the prioritized ranking to accept a total number of barcodes reported by the computer vision application associated with the overhead camera 125. However, if a flatbed scanner 127 reported barcode is unique accept the flatbed scanner 127 barcodes. If the computer vision application identifies an unknown item not reported as a barcode by the other peripherals, item recognizer 124 utilizes another different computer vision application to determine a PLU code for an unidentified non-barcoded item, such as a produce item. When this occurs, item recognizer 124 interacts with transaction manager 123 to cause the customer to remove the other items off the tray so that the PLU code for the item can be weighed. Any remaining unknown items cause item recognizer 124 to initiate through interaction with transaction manager 123 an existing unknown item work flow on terminal 120 to resolve the unknown item or unknown items for the transaction.

Figure 1B:
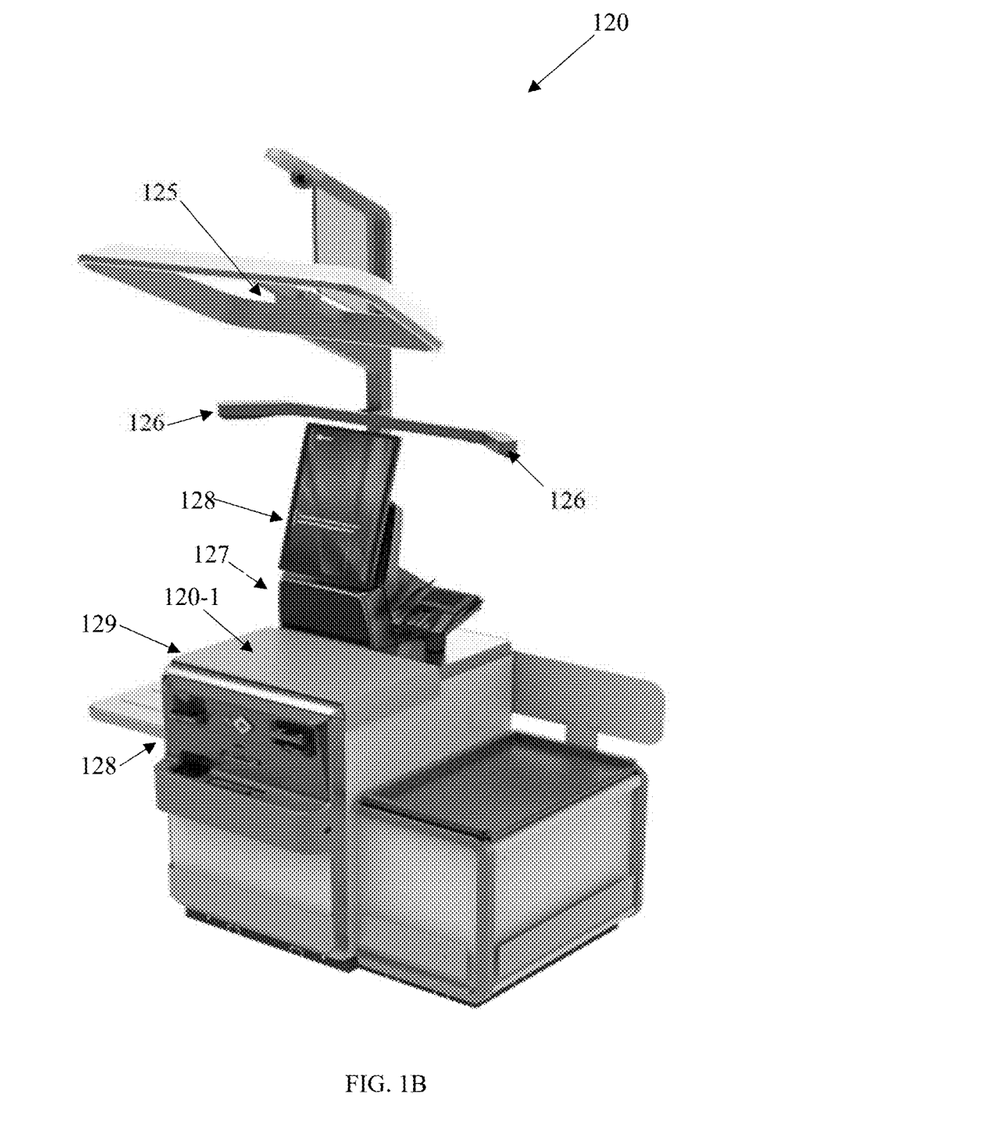
FIG. 1B is a diagram of a self-checkout configured to perform interruption free vision checkouts, according to an example embodiment.

FIG. 1B is a diagram of a self-checkout configured to perform interruption free vision checkouts, according to an example embodiment. Again, self-checkout or terminal 120 is shown in greatly simplified form with only those components necessary for comprehending the teachings presented herein illustrated.

Terminal 120 includes at least one overhead camera 125, at least two side view cameras 126, one or more scanners 127 one of which is at least a barcode scanner 127, a wireless Bluetooth® transceiver 128, an NFC transceiver 128, and an RFID sensor 129. The overhead camera 125 captures and provided top down images of tray 120-1 and a corresponding computer vision application monitors to detect when a transaction is to be initiated based on a presence of a hand, items, and a non-presence of a hand with items on the tray 120-1 for a configured period of elapsed time. Item recognizer 124 interacts with the computer vision application to initiate a given transaction and reset a transaction through transaction manager 123.

Figure 1C:
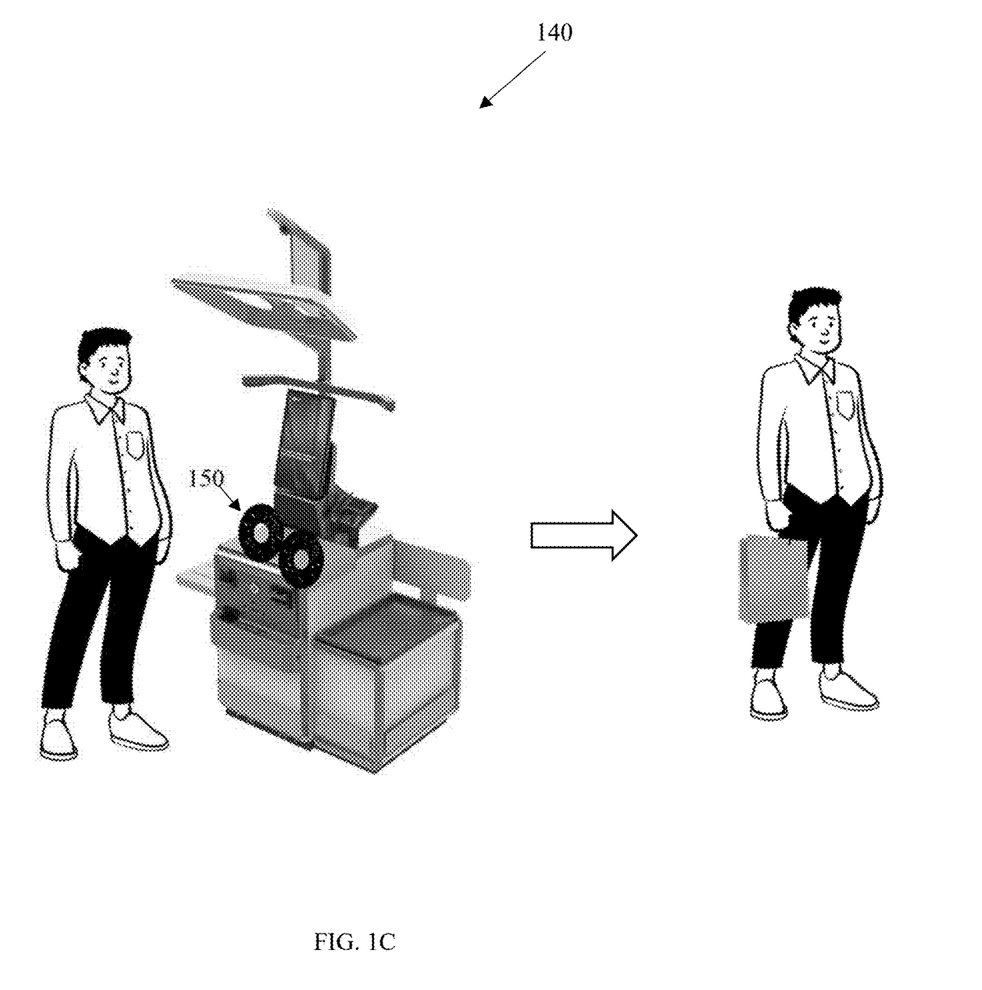
FIG. 1C is a graphic depicting a consumer's interruption free vision checkout, according to an embodiment.

FIG. 1C is a graphic depicting a consumer's interruption free vision checkout 140, according to an embodiment. A consumer of a customer approaches terminal 120 and places items 150 on tray 120-1. Item recognizer 124 initiates a transaction with transaction manager 123. Item recognizer 124 polls the peripherals and determines that there are two items 150 on the tray 120-1 of a same type. Item recognizer 124 returns two barcodes or a single barcode with a quantity counter of 2 to transaction manager 123. Transaction manager 123 presents the item details associated with the barcode and transaction price through the transaction user interface to the customer and completes payment for the transaction. The customer bags the items 150 and exists the store.

Figure 1D:
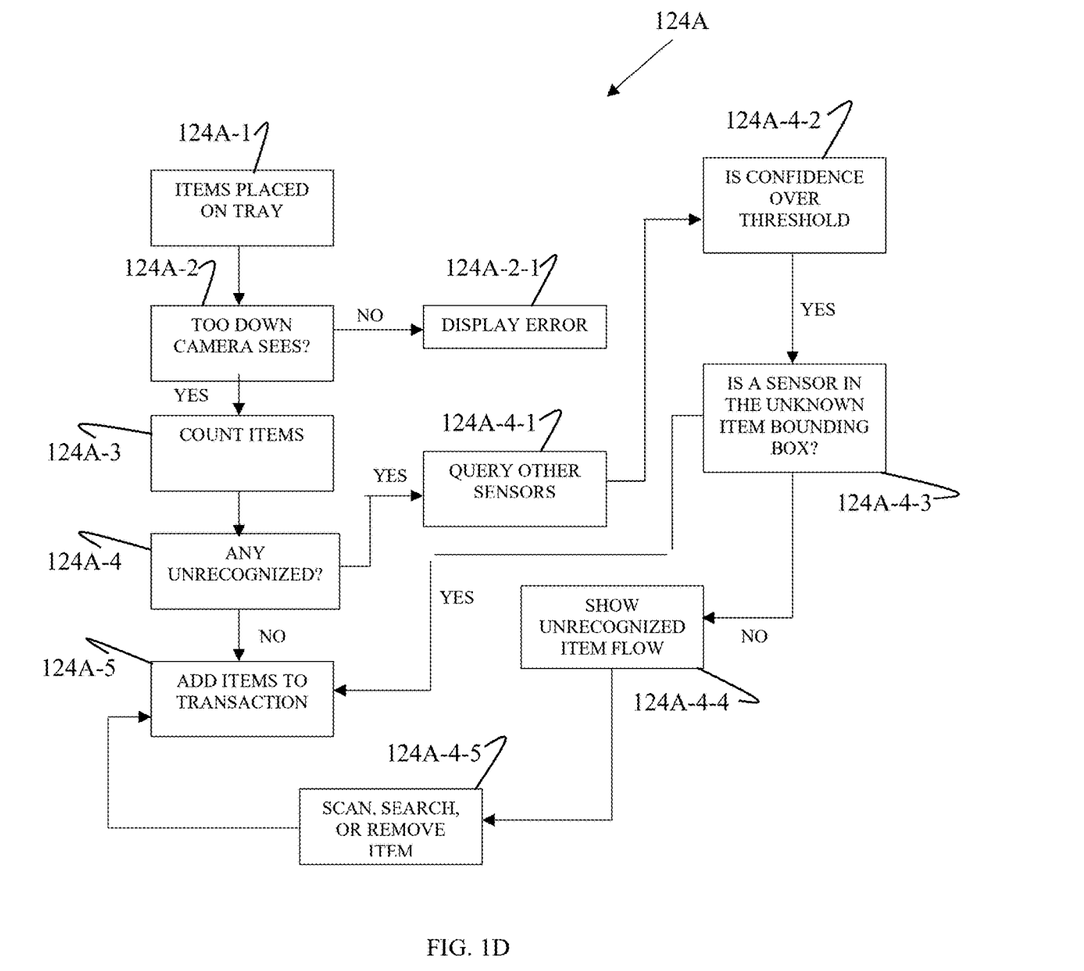
FIG. 1D is a flow diagram of a method for interruption free vision checkouts, according to an example embodiment.

FIG. 1D is a flow diagram of a method 124A for interruption free vision checkouts, according to an example embodiment. Item recognizer 124 processes method 124A.

At 124A-1, item recognizer 124 identifies through a computer vision application items placed on tray 120-1 of terminal 120. At 124A-2, item recognizer 124 determined through the computer vision application that the overhead or top down camera 125 sees or identifies the items on the tray 120-1. At 124A-2-1, if the items are not detected by the computer vision application, the item recognizer 124 instructions the transaction manager 123 to display an error to the customer through the transaction user interface.

At 124A-3, item recognizer 124 uses the computer vision application to count the items on the tray 120-1. At 124A-4, item recognizers 124 determines if the computer vision application was able to identify all the items on the tray 120-1 or whether there are unrecognized items still on the tray 120-1. Assuming all the items were recognized, at 124A-5, item recognizers provided the item barcodes for the items to the transaction manager 123 to complete the transaction.

When item recognizer 124 determines that there are unrecognized items on the tray 120-1, at 124A-4-1, item recognizer 124 queries or polls the sensors or peripherals. At 124A-4-2, item recognizer 124 checks the confidence values for the item barcodes returned from the sensors or peripherals to determine if the confidence values are above a threshold. Assuming the confidence values are over the threshold, at 124A-4-3, item recognizer 124 checks to see if the sensor or peripheral is reporting the item barcode in the unknown bounding box for the unknown item. Assuming the item barcode is in the unknown bounding box for the unknown item, at 124A-5, item recognizer 124 provides the item barcode to transaction manager 123 to complete the transaction. If the item barcode reported is not associated with the bounding box of the unknown item, at 124A-4-4, item recognizer 124 instructs transaction manger 123 to initiate an unknown item workflow for resolving the item. This causes, at 124A-4-5, the unknown item to be manually scanned, searched for, or removed from the transaction and when not removed, at 124A-5, the item barcode for the unknown item is provided to the transaction manager 123 to complete the transaction.

System 100 provides a vision-centric but not exclusive self-checkout by augmenting computer vision with non-vision based sensors and wireless transceivers and combining approaches in a workflow that maintains the speed of vision checkouts while greatly reducing then number of unrecognized items during the checkout. The sensors or peripherals provide a bounding box or region identifier, a barcode, and a confidence factor for each item recognized on a tray 120-1 of terminal 120. Existing unknown or unrecognized item work flows are leveraged when any item is still unrecognized for a checkout/transaction. System 100 also reduces opportunities for shrink by performing improved item recognition and reducing the number of times an unrecognized item workflow needs to be processed during a checkout.

Figure 2:
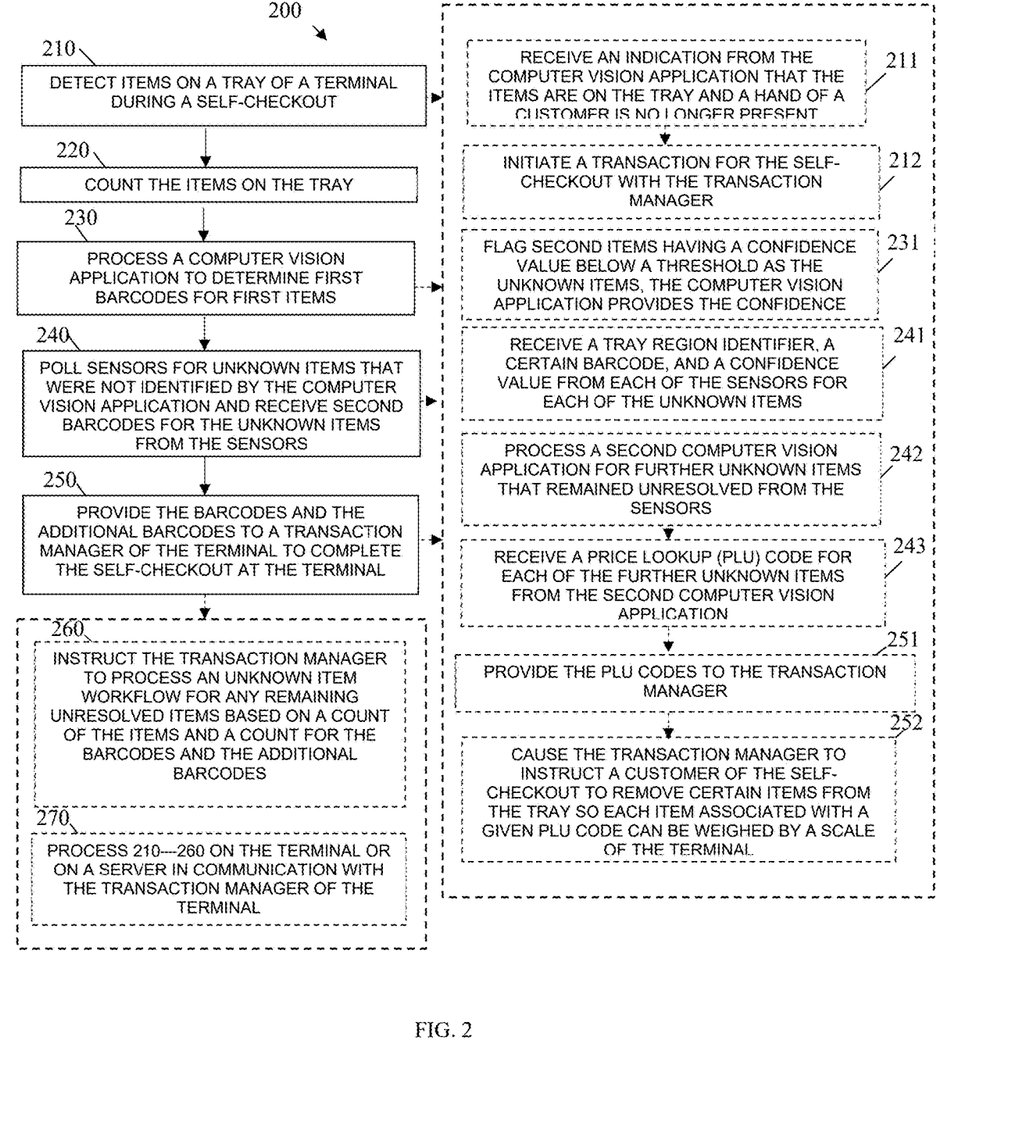
FIG. 2 is a flow diagram of another method for interruption free vision checkouts, according to an example embodiment.

The above-referenced embodiments and other embodiments are now discussed with reference to FIGS. 2 and 3. FIG. 2 is a diagram of a method 200 for interruption free vision checkouts, according to an example embodiment. The software module(s) that implements the method 200 is referred to as an "vision-centric checkout item recognizer." The vision-centric checkout item recognizer is implemented as executable instructions programmed and residing within memory and/or a non-transitory computer-readable (processor-readable) storage medium and executed by one or more processors of one or more devices. The processor(s) of the device(s) that executes the vision-centric checkout item recognizer are specifically configured and programmed to process the vision-centric checkout item recognizer. The vision-centric checkout item recognizer may have access to one or more network connections during its processing. The network connections can be wired, wireless, or a combination of wired and wireless.

In an embodiment, the device that executes the vision-centric checkout item recognizer is terminal 120. In an embodiment, the device that executes the vision-centric checkout item recognizer is cloud or server 110. In an embodiment, the vision-centric checkout item recognizer is item recognizer 124, transaction manager 123, and/or method 124A.

At 210, vision-centric checkout item recognizer detects items on a tray 120-1 of a terminal 120 during a self-checkout. In an embodiment, at 211, the vision-centric checkout item recognizer receives an indication from a computer vision application that the items are on the tray 120-1 and a hand of a customer is no longer present. In an embodiment of 211 and at 212, the vision-centric checkout item recognizer initiates a transaction for the self-checkout with a transaction manager 123 of the terminal 120.

At 220, the vision-centric checkout item recognizer counts the items on the tray 120-1. In an embodiment, the vision-centric checkout item recognizer obtains a count of the items from a computer vision application that counts items on the tray from an overhead or top down image of the tray 120-1.

At 230, the vision-centric checkout item recognizer processes a computer vision application to determine first barcodes for first items. In an embodiment, at 231, the vision-centric checkout item recognizer flags second items having a confidence value below a threshold as unknown items. The computer vision application provides the confidence values.

At 240, the vision-centric checkout item recognizer polls sensors for unknown items that were not identified by the computer vision application. The vision-centric checkout item recognizer receives second barcodes for the unknown items from the sensors.

In an embodiment, at 241, the vision-centric checkout item recognizer receives a tray region identifier, a certain barcode, and a confidence value from each of the sensors for each of the unknown items. In an embodiment, at 242, the vision-centric checkout item recognizer processes a second computer vision application for further unknown items that remained unresolved from the sensors. In an embodiment of 242 and at 243, the vision-centric checkout item recognizer receives a PLU code for each of the further unknown items from the second computer vision application.

At 250, the vision-centric checkout item recognizer provides the barcodes and the additional barcodes to a transaction manager 123 of the terminal 120 to complete the self-checkout at the terminal 120. In an embodiment of 243 and 250, at 251, the vision-centric checkout item recognizer provides the PLU codes to the transaction manager 123. In an embodiment of 251 and at 252, the vision-centric checkout item recognizer causes the transaction manager 123 to instruct a customer of the self-checkout to remove certain items from the tray so each item associated with a given PLU code can be weighed by a scale of the terminal 120.

In an embodiment, at 260, the vision-centric checkout item recognizer instructs the transaction manager 123 to process an unknown item workflow for any remaining unresolved items based on a count of the items and a count for the barcodes and the additional barcodes. In an embodiment, at 270, the vision-centric checkout item recognizer (210-260) processes on the terminal 120 or processes on a cloud 110 or a server 110 in communication with the transaction manager 123 of the terminal 120.

Figure 3:
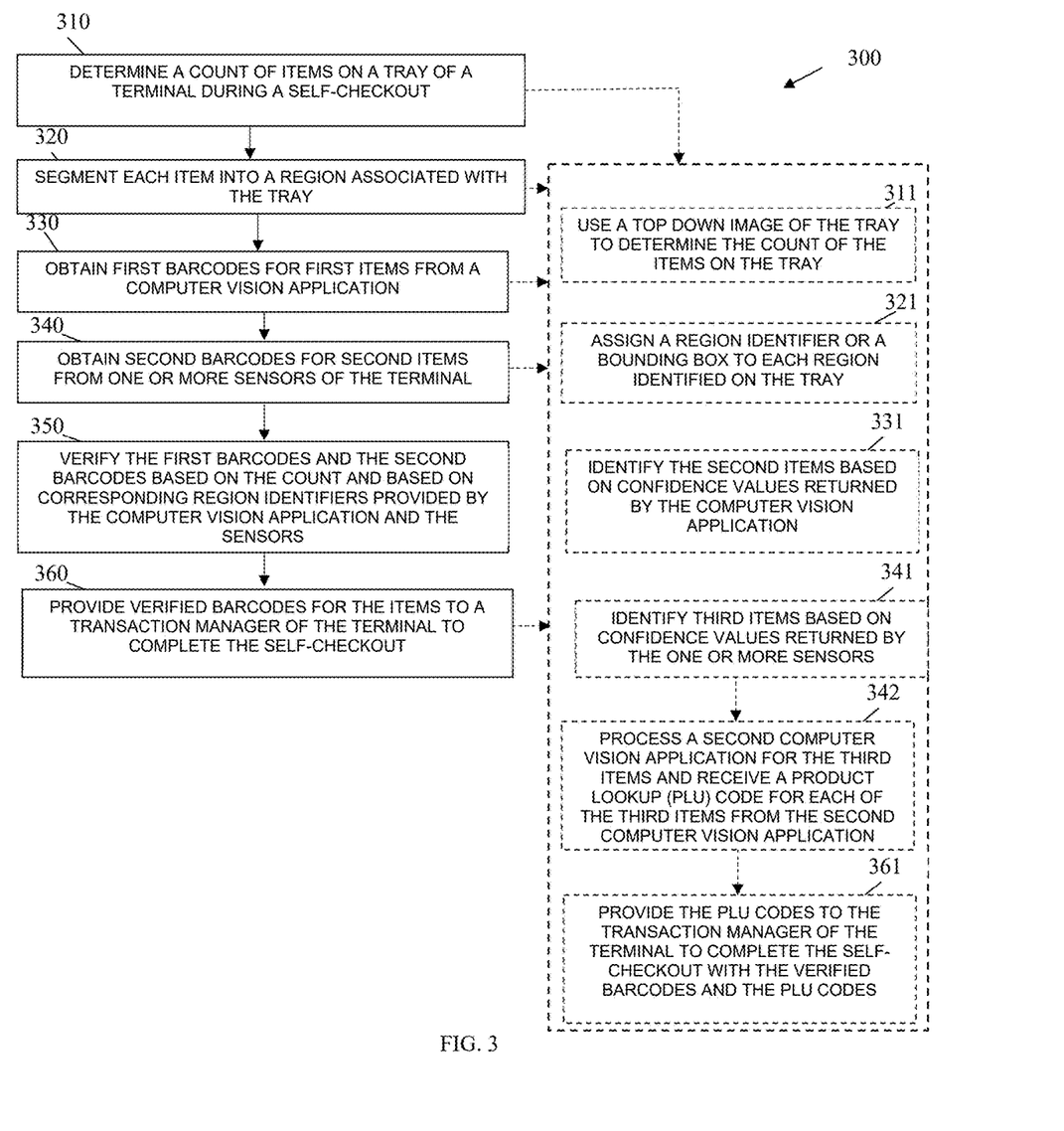
FIG. 3 is a flow diagram of yet another method for interruption free vision checkouts, according to an example embodiment.

FIG. 3 is a diagram of another method 300 for interruption free vision checkouts, according to an example embodiment. The software module(s) that implements the method 300 is referred to as an "item recognizer." The item recognizer is implemented as executable instructions programmed and residing within memory and/or a non-transitory computer-readable (processor-readable) storage medium and executed by one or more processors of one or more device(s). The processors that execute the item recognizer are specifically configured and programmed for processing the item recognizer. The item recognizer may have access to one or more network connections during its processing. The network connections can be wired, wireless, or a combination of wired and wireless.

In an embodiment, the device that executes item recognizer is terminal 120. In an embodiment, terminal 120 is an SST for a self-checkout or a point-of-sale (POS) terminal operated by an attendant for an attendant assisted checkout/transaction of a customer. In an embodiment, the device that executes the item recognizer is cloud or server 110. In an embodiment, the item recognizer is transaction manager 123, item recognizer 124, method 124A, and/or method 200. The item recognizer presents another and, in some ways, enhanced processing perspective from that which was discussed above for system 100, method 124A, and method 200.

At 310, the item recognizer determines a count of items on a tray 120-1 of a terminal 120 during a self-checkout. In an embodiment, at 311, the item recognizer uses a top down image of the tray 120-1 to determine the count of the items on the tray 120-1.

At 320, the item recognizer segments each item into a region associated with the tray 120-1. In an embodiment, at 321, the item recognizer assigns a region identifier or a bounding box to each region identified on the tray 120-1.

At 330, the item recognizer obtains first barcodes for first items from a computer vision application. In an embodiment, at 331, the item recognizer identifies the second items based on confidence values returned by the computer vision application.

At 340, the item recognizer obtains second barcodes for second items from one or more sensors of the terminal 120. In an embodiment, at 341, the item recognizer identifies third items based on confidence values returned by the sensors. In an embodiment of 341 and at 342, the item recognizer processes a second computer vision application for the third items and the item recognizer receives a PLU code for each of the third items from the second computer vision application.

At 350, the item recognizer verifies the first barcodes and the second barcodes based on the count and based on corresponding region identifiers provided by the computer vision application and the sensors. At 360, the item recognizer provides verified barcodes for the items to a transaction manager 123 of the terminal 120 to complete the self-checkout at the terminal 120. In an embodiment of 342 and 360, at 361, the item recognizer provides the PLU codes to the transaction manager 123 of the terminal 120 to complete the self-checkout with the verified barcodes and the PLU codes.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    detecting items on a tray of a terminal during a self-checkout;
    counting the items on the tray;
    utilizing a computer vision application to determine first barcodes for first items;
    polling sensors for unknown items that were not identified by the computer vision application and receiving additional barcodes for the unknown items from the sensors; and
    providing the first barcodes and the additional barcodes to a transaction manager of the terminal to complete the self-checkout at the terminal.

2. The method of claim 1, wherein detecting further includes receiving an indication from the computer vision application that the items are on the tray and a hand of a customer is no longer within a field-of-view of one or more cameras.

3. The method of claim 2, wherein receiving further includes initiating a transaction for the self-checkout with the transaction manager.

4. The method of claim 1, wherein utilizing further includes flagging second items having a confidence value below a threshold as the unknown items, wherein the confidence value is provided by the computer vision application.

5. The method of claim 1, wherein polling further includes receiving a tray region identifier, a certain barcode, and a confidence value from each of the sensors for each of the unknown items.

6. The method of claim 1, wherein polling further includes processing a second computer vision application for further unknown items that remained unresolved from the sensors.

7. The method of claim 6, wherein processing the second computer vision application further includes receiving a price-lookup (PLU) code for each of the further unknown items from the second computer vision application.

8. The method of claim 7, wherein providing further includes providing each PLU code to the transaction manager.

9. The method of claim 8, wherein providing each the PLU code further includes causing the transaction manager to instruct a customer of the self-checkout to remove certain items from the tray so each item associated with a particular PLU code can be weighed by a scale of the terminal.

10. The method of claim 1 further comprising, instructing the transaction manager to process an unknown item workflow for any remaining unresolved items based on a count of the items and a count for the first barcodes and the additional barcodes.

11. The method of claim 1 further comprising, processing the method on the terminal or on a server in communication with the transaction manager of the terminal.

12. A method, comprising:
   determining a count of items on a tray of a terminal during a self-checkout;
   segmenting each item into a region associated with the tray;
   obtaining first barcodes for first items from a computer vision application;
   obtaining second barcodes for second items from one or more sensors of the terminal;
   verifying the first barcodes and second barcodes based on the count and based on corresponding region identifiers provided by the computer vision application and the one or more sensors; and
   providing verified barcodes for the items to a transaction manager of the terminal to complete the self-checkout at the terminal.

13. The method of claim 12, wherein determining further includes using a top down image of the tray to determine the count of the items on the tray.

14. The method of claim 12, wherein segmenting further includes assigning a region identifier or a bounding box to each region identified on the tray.

15. The method of claim 12, wherein obtaining the first barcodes further includes identifying the second items based on confidence values returned by the computer vision application.

16. The method of claim 12, wherein obtaining the second barcodes further includes identifying third items based on confidence values returned by the one or more sensors.

17. The method of claim 16, wherein identifying further includes processing a second computer vision application for the third items and receiving a product-lookup PLU (code) for each of the third items from the second computer vision application.

18. The method of claim 17, wherein processing further includes providing each PLU code to the transaction manager of the terminal to complete the self-checkout with the verified barcodes and each PLU code.

19. A terminal, comprising:
   at least one processor and a non-transitory computer-readable storage medium;
   the non-transitory computer-readable storage medium comprises executable instructions; and
   the executable instructions when executed on the at least one processor cause the at least one processor to perform operations comprising:
      detecting items on a tray of the terminal during a checkout;
      counting the items on the tray;
      processing a computer vision application to determine first barcodes for first items;
      polling sensors for second barcodes associated with second items;
      processing a second computer vision application for product-lookup (PLU) codes associated with third items; and
      providing the first barcodes, the second barcodes, and the PLU codes to a transaction manager of the terminal to complete the checkout at the terminal.

20. The terminal of claim 19, wherein the terminal is a self-service terminal (SST), and the checkout is a self-checkout, or the terminal is a point-of-sale (POS) terminal, and the checkout is an attendant assisted checkout.

* * * * *